US006697053B2

United States Patent
Kajihara

(10) Patent No.: US 6,697,053 B2
(45) Date of Patent: Feb. 24, 2004

(54) IMAGE SENSOR MOUSE

(75) Inventor: Kiyoshi Kajihara, Gunma (JP)

(73) Assignee: Hosiden Corporation, Osaka (JP)

( * ) Notice: Subject to any disclaimer, the term of this patent is extended or adjusted under 35 U.S.C. 154(b) by 238 days.

(21) Appl. No.: 10/006,257

(22) Filed: Dec. 4, 2001

(65) Prior Publication Data

US 2002/0070919 A1 Jun. 13, 2002

(30) Foreign Application Priority Data

Dec. 8, 2000 (JP) ........................... 2000-374628

(51) Int. Cl.[7] ................................................. G09G 5/08
(52) U.S. Cl. .................... 345/166; 345/165; 345/179
(58) Field of Search ................................ 345/165, 166, 345/163, 156, 157, 175, 179; 250/221; 341/31

(56) References Cited

U.S. PATENT DOCUMENTS

| 4,364,035 A | * | 12/1982 | Kirsch | 345/166 |
| 4,920,260 A | * | 4/1990 | Victor et al. | 250/221 |
| 5,994,710 A | * | 11/1999 | Knee et al. | 250/557 |
| 6,172,354 B1 | * | 1/2001 | Adan et al. | 250/221 |
| 6,281,882 B1 | * | 8/2001 | Gordon et al. | 345/166 |
| 6,486,873 B1 | * | 11/2002 | McDonough et al. | 345/163 |

FOREIGN PATENT DOCUMENTS

| JP | 7152337 | 6/1995 |
| JP | 10208502 | 8/1998 |
| JP | 3073562 | 9/2000 |

* cited by examiner

*Primary Examiner*—Dennis-Doon Chow
(74) *Attorney, Agent, or Firm*—David N. Lathrop, Esq.; Gallagher & Lathrop

(57) ABSTRACT

An image sensor mouse of a contact-less type is provided which employs a full color light emitting diode 80 having a red (R) light emitting unit diode 801, a green (G) light emitting unit diode 802, and a blue (B) light emitting unit diode 803, and a voltage control integrated circuit 910 which makes selection of one or more of the three unit diodes to be operative by varying a driving voltage applicable across each of the unit diodes separately to vary intensity of the emitted light therefrom, whereby obtaining a mixed light in arbitrary color.

4 Claims, 8 Drawing Sheets

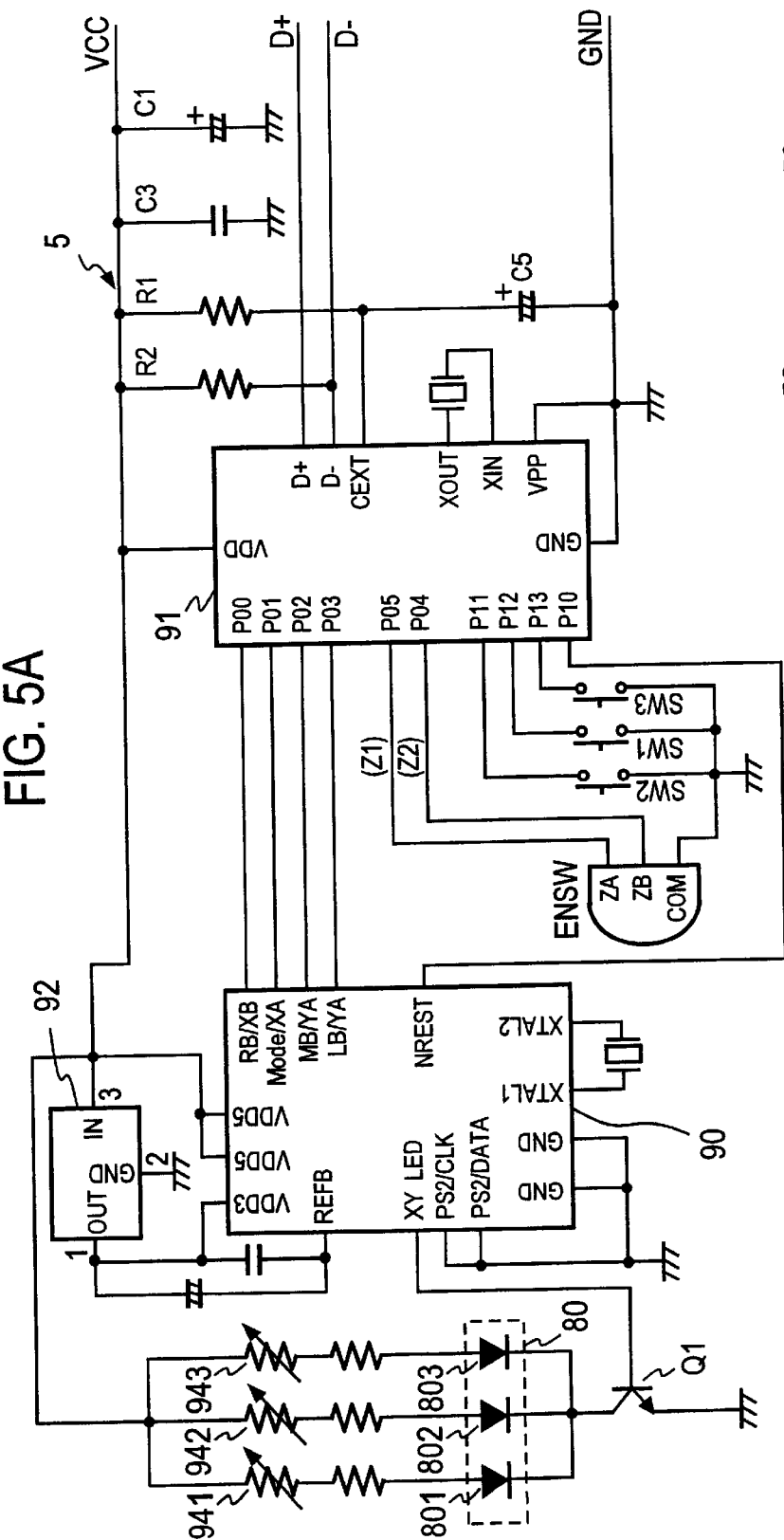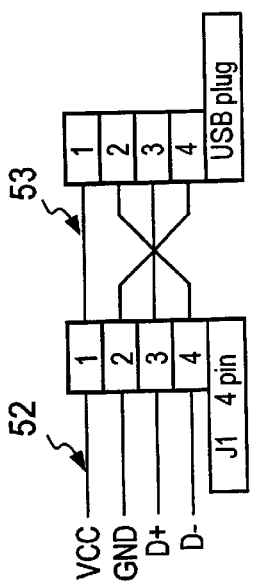
FIG. 5A
FIG. 5B

IMAGE SENSOR MOUSE

BACKGROUND OF THE INVENTION

1. Field of the Invention

The present invention relates to an image sensor mouse. More particularly, the present invention relates to an image sensor mouse in which a full color light emitting diode is used as a light source for irradiating a reflection surface on which the image sensor mouse is moved.

2. Description of the Related Art

As a mouse connected to a computer via a cable for pointing a cursor position on a computer display device, there has conventionally been used a direction pointing device like a mouse by which an amount of movement of a ball moving on a plane or reflecting surface is converted into values of X-Y axis coordinates to obtain an X-axis coordinate signal and a Y-axis coordinate signal. In such a contact type mouse in which a ball moves on a plane, there is a danger to cause an operation error due to the contamination of the mouse by the dust.

For this reason, there has been developed a contact-less type mouse that optically obtains an X-axis coordinate signal and a Y-axis coordinate signal without using a ball for obtaining an X-axis coordinate signal and a Y-axis coordinate signal. For example, refer to U.S. Pat. No. 4,751,505. As a contact-less type mouse, there has been in practical use a mouse that detects an amount of movement and a direction of movement of the mouse using an image processing coordinate conversion integrated circuit, and converts the detected results into an X-axis coordinate signal and a Y-axis coordinate signal as output signals. The contact-less type mouse will be briefly explained below with reference to FIGS. 6 and 7.

A reference numeral 1 denotes an upper side case of the mouse made of a light transmittable plastic material. This upper side case 1 has a crooked upward convex shape. On the front portion of the upper side case 1 as shown on the left side of the plan view in FIG. 6, a selection key 611 is connected to the left side of a primary part 10 of the mouse via a hinge, and a menu display key 621 is connected to the right side of the primary part 10 of the mouse via a hinge. A reference numeral 641 denotes a slit formed on the border between the selection key 611 and the menu display key 621.

A reference numeral 2 denotes a lower side case sheltered by the upper side case 1. An outer surface of a bottom wall 21 of the lower side case 2 is formed on a plane on which the bottom wall 21 moves contacting with a reflection surface S. At the substantially central portion of the bottom wall 21, a central aperture 20 is formed. An arc front edge projection 211 is formed at a front position close to the central aperture 20 of the inner surface of the bottom wall 21, and an arc rear edge projection 212 is formed at a rear position close to the central aperture 20 of the inner surface of the bottom wall 21. A pair of left and right protrusions 22 are formed at further front position on the inner surface of the bottom wall 21.

A lens member 3 made of a transparent material is engaged with the arc front edge projection 211 and the arc rear edge projection 212 formed on the inner surface of the bottom wall 21 of the lower side case 2 so as to be positioned between those projections 211 and 212. This lens member 3 comprises a collimator lens 31 for collimating a light radiated from a light emitting diode 8, which is to be explained later, an optical guide part 32 for guiding a reflected light reflected by the reflection surface S, an optical coupling part 33 for coupling the collimator lens 31 and the optical guide part 32, and a disk type positioning board 34 for supporting thereon those collimator lens 31, the optical guide part 32 and the optical coupling part 33 which are integrally assembled together into one body.

A reference numeral 5 denotes a printed circuit board, which is secured to the lower side case 2 such that the printed circuit board 5 is mounted on the top ends of the pair of protrusions 22 formed at the front position on the bottom wall 21 of the lower side case 2, the top end of the arc front edge projection 211 and the top end of the arc rear edge projection 212. An optical guide part aperture 51 is formed on the printed circuit board 5 correspondingly to the optical guide part 32 and the optical coupling part 31 of the lens member 3. The printed circuit board 5 is connected to a computer, a power supply, and other external circuit devices (not shown) via a cable 52 and a plug, for example, a universal serial bus (USB) plug 53. A reference numeral 50 denotes a connector.

A reference numeral 7 denotes an image processing coordinate conversion integrated circuit mounted on the upper surface of the printed circuit board 5. This image processing coordinate conversion integrated circuit 7 has a light receiving lens 71 on the lower surface thereof. In addition, the image processing coordinate conversion integrated circuit 7 includes therein an image sensor 72 that has a central axis common with a central axis of the light receiving lens 71 and an optical axis of the aforementioned optical guide part 32. By this structure, the central axis of the light receiving lens 71, the optical axis of the optical guide part 32 and the central axis of the image sensor 72 are set in a common axis. The image processing coordinate conversion integrated circuit 7 is electrically connected to the wirings (not shown) formed on the printed circuit board 5.

A reference numeral 60 denotes a pair of shaft-supporting props for a scroll wheel 64 which are formed on the upper surface of the bottom wall 21 of the lower side case 2. Each of the shaft-supporting props 60 has thereon a shaft-supporting slit 661 in which a shaft 66 is movable upward and downward. Reference numerals 61, 62 and 63 denote a selection switch, a menu display switch and a scroll switch, respectively, and those switches are mounted on the upper surface of the printed circuit board 5. The selection switch 61 is operated by a depression movement of the selection key 611 formed on the upper side case 1, and the menu display switch 62 is operated, similarly to the selection key 61, by a depression movement of the menu display key 621 formed on the upper side case 1. The scroll switch 63 is operated and controlled by a downward movement of the driving shaft 66 in the shaft-supporting slits of the shaft-supporting props 60 caused by a depression movement of the scroll wheel 64 that is projected upward from the slit 641 formed between the selection key 611 and the menu display key 621. Further, the scroll switch 63 is biased upward by a restoring bias spring force (not shown). When the depression force of the scroll wheel 64 is removed, the shaft 66 is moved upward, and the scroll switch 63 is restored to its off state. Under the condition that this mouse is supported by a specific operating system, by having the entire image sensor mouse scan toward arbitrary direction leaving the scroll wheel 64 depressed, a displayed screen image can be scrolled toward the scanning direction. A reference numeral 65 denotes a mechanical encoder. When the scroll wheel 64 is rotated, the mechanical encoder 65 is rotated via the rotary movement of the driving shaft 66. The displayed screen image is scrolled upward and downward correspondingly to the rotation of the encoder 65. The rotation ratio between the scroll wheel 64 and the encoder 65 is designed to be 1:1.

Here, the driving operation of the light emitting diode 8 will be explained below with reference to FIGS. 8A and 8B. This light emitting diode 8 is mounted on the upper surface of the printed circuit board 5, and emits a single color light having red color (R). This light emitting diode 8 is connected to an external power supply (not shown) via the printed wirings on the printed circuit board 5, the cable 52 and the USB plug 53. A reference numeral 90 denotes a switching control processing integrated circuit that controls the single color light emitting diode 8 either to emit a bright light when it is in use, or to emit a dark light when it is not in use. A reference numeral 91 denotes a voltage control integrated circuit, which controls a voltage regulator 92. By the control of the voltage regulator 92, a voltage of 3 v is obtained from a terminal OUT of the voltage regulator 92, and this 3 v voltage is applied to the integrated circuit 90 as its driving voltage. A switching transistor $Q_1$ is connected in series to the single color light emitting diode 8, and a 5 v voltage VCC from the external power supply (not shown) is applied to this series connection circuit. By a program control of the switching control processing integrated circuit 90, an electric potential obtained from a terminal XY LED of the switching control processing integrated circuit 90 is changed in accordance with a usage state of the mouse, and a conductivity state of the switching transistor $Q_1$ is controlled. That is, when the mouse is in use, the switching transistor $Q_1$ is conductive, so that the single color light emitting diode 8 emits a bright red (R) light by means of the 5 v voltage VCC. As a result, the reflection surface S is irradiated by the emitted red (R) light. On the other hand, when the mouse is not in use, the conductivity of the transistor $Q_1$ is restricted, and the single color light emitting diode 8 emits a dark red (R) light.

The operation of this mouse will be explained below. The mouse performs a scanning operation such that the bottom wall 21 formed in the plane shape under the lower side case 2 is contacted with the reflection surface S such as a surface of a desk. The light radiated from the single color light emitting diode 8 that is in the light emitting state is inputted to the collimator lens 31, by which it is collimated to output a collimated light which then irradiates the reflection surface S via the optical coupling part 33. The image of the irradiated portion of the reflection surface S is formed on the image sensor 72 of the image processing coordinate conversion integrated circuit 7 via the optical guide part 32 and the light receiving lens 71. When the mouse is moved toward a certain direction horizontally on the reflection surface, an ever changing moving image of the reflection surface S is formed on the image sensor 72 of the image processing coordinate conversion integrated circuit 7. The image processing coordinate conversion integrated circuit 7 performs a recognition and computing process of the image patterns formed on the image sensor 72 at a rate of 1500 times per second. The content of the recognition and computing process of the formed image patterns is to compare one image pattern formed immediately before on a specific minute area of the image sensor 72 with another image pattern being formed currently and to perform a computing process to find the moving direction and the amount of movement of the formed image pattern. This recognition and computing processes are performed for the entire area of the image sensor 72. Based upon the moving direction and the amount of movement of the formed image pattern, an X-axis coordinate signal and a Y-axis coordinate signal are obtained, and those signals are transmitted to the external computer (not shown) via the cable 52.

In the aforementioned optical type image sensor mouse, its upper side case 1 is made of a light transmittable plastic material. Therefore, the light radiated from the light source for irradiating the reflection surface on which the image sensor mouse is moved is transmitted or leaks out through the upper side case 1. An operator of the mouse can therefore easily recognize the color of the light as well as the emitting state of the light source by the transmitted or leaking out light through the upper side case 1.

However, in the conventional image sensor mouse as described hereinabove, a light emitting diode that emits a red (R) single color light is used as a light source. Therefore, only a red (R) light is always emitted from the light source, and hence the operator cannot expect by nature that the emitted light in different colors, i.e., other than color red can be used.

In addition, the light source of the conventional image sensor mouse emits only a single color in red (R). Therefore, if the color of the light emitted from the light source is not distinguished or poor in recognition from the color of the corresponding reflection surface, the mouse may not be operable or may erroneously operate.

BRIEF SUMMARY OF THE INVENTION

It is an object of the present invention to provide an image sensor mouse that can change the color of the light emitted therefrom when the mouse is in use, and can solve the aforementioned problem in poor recognition.

In the image sensor mouse according to the present invention, instead of using the single color light emitting diode 8 as used in the conventional image sensor mouse shown in FIGS. 6 and 7, there is used a full color light emitting diode 80 for emitting a light having one of three primary colors of red (R), green (G), and blue (B) or a light having mixed color of those primary colors. In addition, by switching a driving voltage to be applied to each of the red (R) light emitting unit diode 801, the green (G) light emitting unit diode 802, and the blue (B) light emitting unit diode 803 of the full color light emitting diode 80, a single unit diode or a plurality of unit diodes are made active. Moreover, a voltage control integrated circuit 910 for controlling magnitude of each driving voltage for each unit diode is newly developed and is introduced in the image sensor mouse. By this voltage control integrated circuit 910, the lights having different colors respectively emitted from the red (R) light emitting unit diode 801, the green (G) light emitting unit diode 802, and the blue (B) light emitting unit diode 803 of the full color light emitting diode 80 are combined to change the color of the light emitted when the image sensor mouse is in use.

BRIEF DESCRIPTION OF THE SEVERAL VIEWS OF THE DRAWINGS

FIGS. 5A and 5B are circuit diagrams of another embodiment of the present invention shown in FIG. 4;

DETAILED DESCRIPTION OF THE INVENTION

Figure 1:
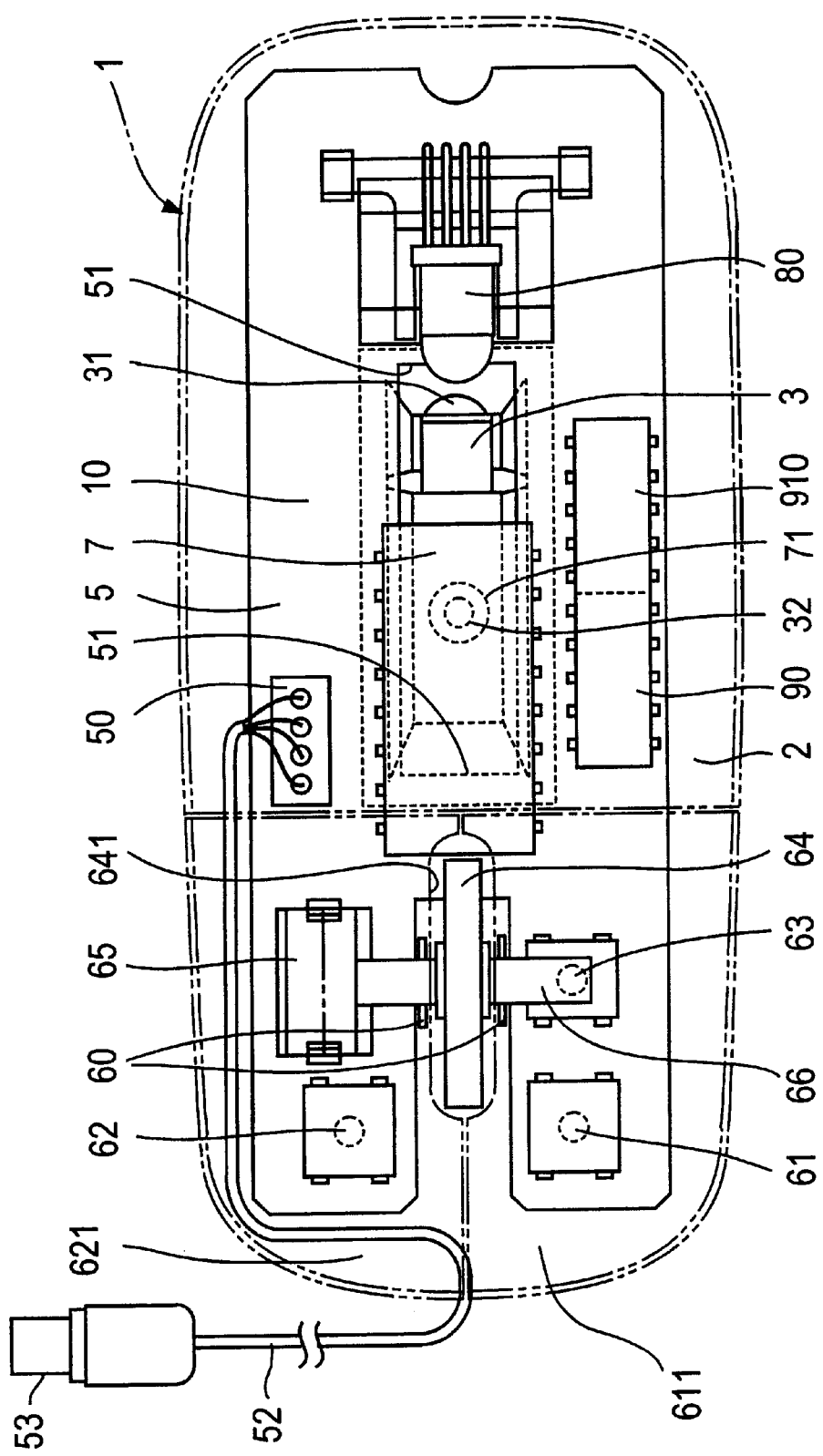
FIG. 1 is a plan view for explaining an embodiment of the present invention.
Figure 2:
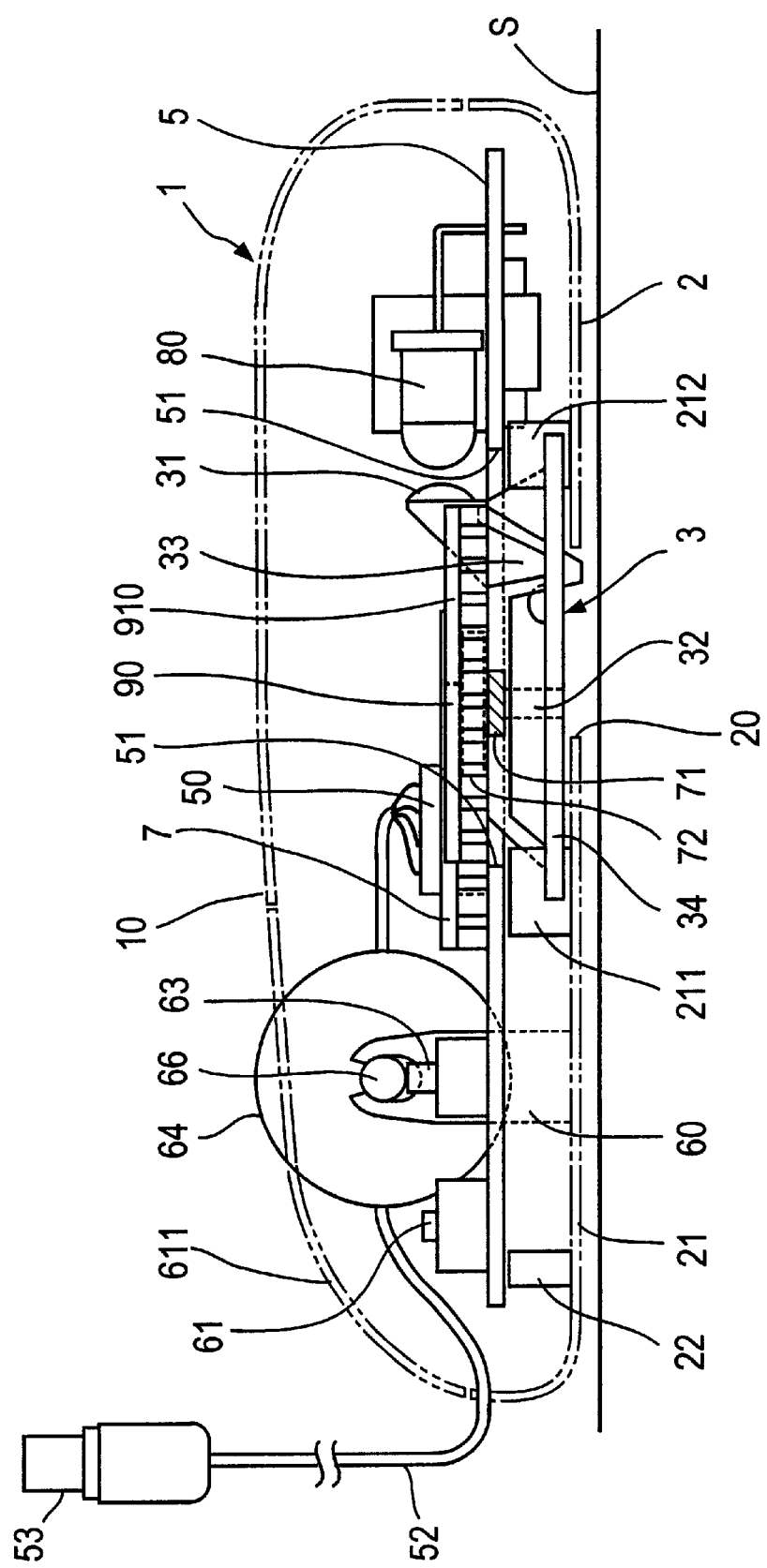
FIG. 2 is a side view of the embodiment of the present invention shown in FIG. 1.
Figure 3:
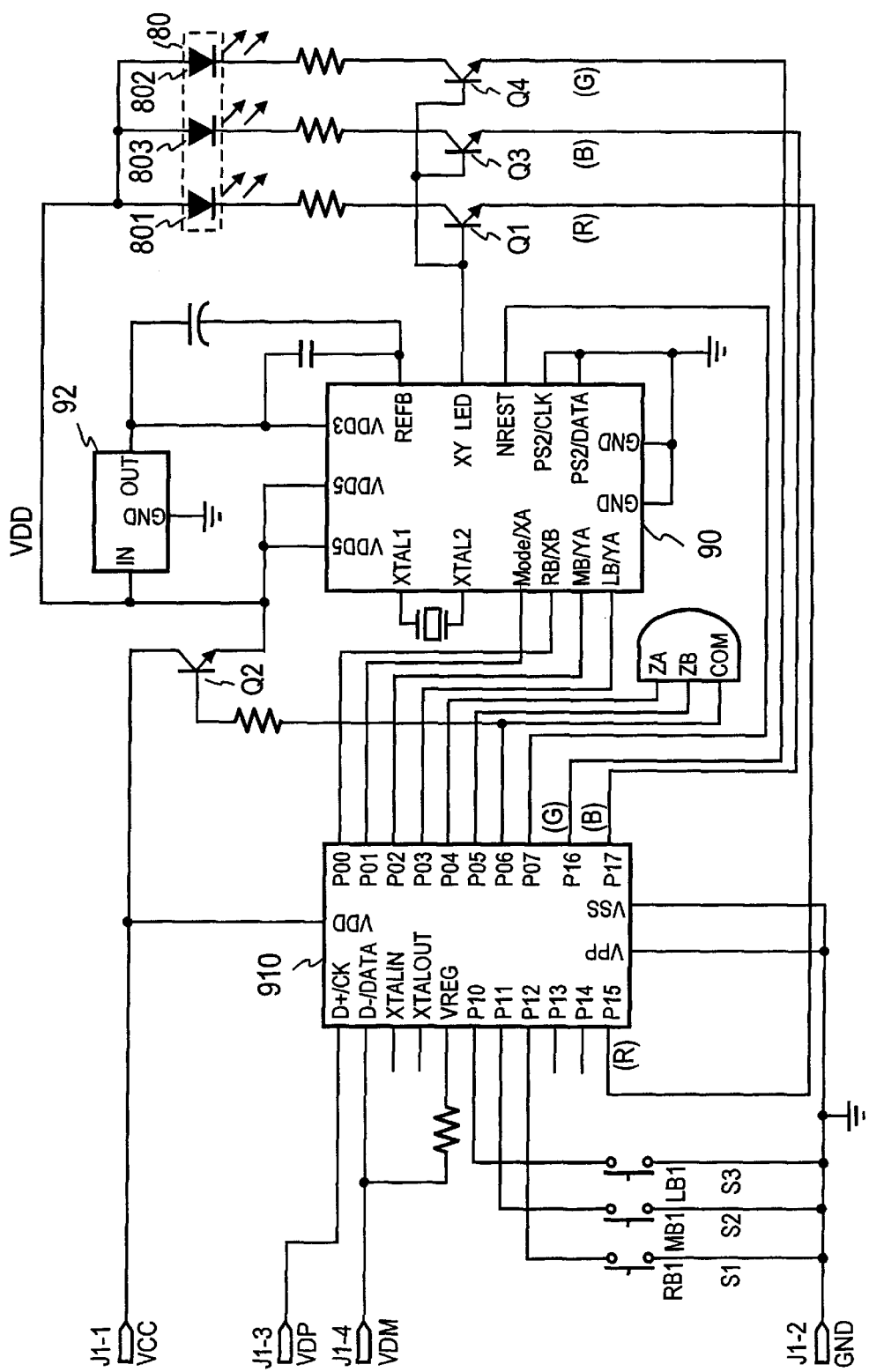
FIG. 3 is a circuit diagram of the embodiment shown above.

A mode for carrying out the present invention will be described below with reference to a first embodiment shown in FIGS. 1, 2 and 3. In this embodiment, members common to those of the conventional example have common reference signs affixed thereto.

The driving operation of the full color light emitting diode 80 will be explained below with reference to FIG. 3. The full color light emitting diode 80 has a red (R) light emitting unit diode 801, a green (G) light emitting unit diode 802, a blue (B) light emitting unit diode 803. The full color light emitting diode 80 is mounted on the printed circuit board 5, and emits a light having one of the three primary colors, i.e., red (R), green (G), and blue (B) when arbitrarily selecting one of the unit diodes is driven alone, or emits a light having a color produced by mixing those colors when a plurality of unit diodes are driven. The cathodes of the respective unit diodes of this full color light emitting diode 80 are connected in common to the external power supply (not shown) via the printed wirings of the printed circuit board 5, a switching transistor $Q_2$, the cable 52, and the USB plug 53. Switching transistors $Q_1$, $Q_4$, and $Q_3$ are connected in series to the respective anodes of the respective unit diodes of the full color light emitting diode 80, respectively. A reference numeral 90 denotes a switching control processing integrated circuit. The conductivity of those switching transistors $Q_1$, $Q_4$, and $Q_3$ is controlled by applying a control voltage from the terminal XY LED of the switching control processing integrated circuit 90 to commonly connected gate terminals of those switching transistors. 910 is a newly developed voltage control integrated circuit in the present embodiment, which controls the voltage regulator 92, and generates, via the voltage regulator 92, voltages at terminals P15 to P17 each changing continuously or stepwise from 0 v to 5 v that are to be respectively applied to the red (R) light emitting unit diode 801, the green (G) light emitting unit diode 802, and the blue (B) light emitting unit diode 803. The full color light emitting diode 80 changes intensity of the emitted red (R) light, the emitted green (G) light, and the emitted blue (B) light by changing the voltages respectively applied to the red (R) light emitting unit diode, the green (G) light emitting unit diode, and the blue (B) light emitting unit diode. The voltage control integrated circuit 910 selects, by a program control, one or two or three of the switching transistors $Q_1$, $Q_3$ and $Q_4$ to make them conductive by respectively switching the output driving voltages for the respective unit diodes obtained at the terminals P15 to P17, so that the full color light emitting diode 80 emits the intended light. In this case, each voltage to be applied to one of the red (R) light emitting unit diode 801, the green (G) light emitting unit diode 802, and the blue (B) light emitting unit diode 803 is set to either 0 v or 5 v by a program control of the voltage control integrated circuit 910.

The voltage control integrated circuit 910 can further change and adjust continuously, by a program control thereof, the voltage to be applied across the red (R) light emitting unit diode 801, the green (G) light emitting unit diode 802, and the blue (B) light emitting unit diode 803 so that the full color light emitting diode 80 can eventually change the intensity of the emitted light, and at the same time, the voltage control integrated circuit 910 selects one or two or three of the switching transistors $Q_1$, $Q_4$ and $Q_3$ to make them conductive so that the unit diodes to be driven are selected. By the above operation, the fill color light emitting diode 80 arbitrarily selects the color of the light to be emitted.

Here, in the case of emitting specified seven colors, the voltages to be respectively applied from the terminals P15 to P17 to the red (R) light emitting unit diode 801, the green (G) light emitting unit diode 802, and the blue (B) light emitting unit diode 803 are only two values of 0 v and 5 v. A unit diode to which 0 v voltage is applied does not emit a light. A unit diode across which 5 v voltage is applied emits a light having its own primary color, i.e., red (R), green (G), or blue (B). Based on this, the specified seven colors, i.e., (red (R))→(red (R)+blue (B))→(blue (B))→(blue (B)+green (G))→(green (G))→(blue (B)+red (R)+green (G))→(green (G)+red (R))→returning to red (R) can be emitted by a program control of the voltage control integrated circuit 910. In this case, an application of the 5 v voltage to corresponding one of the unit diodes is controlled (for example, on/off control) by changing the voltage outputted from corresponding one of the terminals P15 (R), P16 (G), and P17 (B) to a cut-off state or a supply state (for example, on/off control). By this operation, a light having arbitrary color can be generated.

In the case of emitting a full color light, the voltage control integrated circuit 910 is program-controlled to continuously change the values of voltages outputted from the respective terminals P15 (R), P16 (G), and P17 (B), and to continuously apply voltages each having a value between 3 v and 5 v to the corresponding red (R) light emitting unit diode 801, green (G) light emitting unit diode 802, and blue (B) light emitting unit diode 803 via the voltage regulator 92.

For example, a voltage rising from 3 v to 5 v is continuously applied to those unit diodes for one second.

Alternatively, the voltage applied only to the blue (B) light emitting unit diode is changed step-wize, for example, 4 v→5 v→3 v, and a voltage continuously rising from 3 v to 5 v is applied to the other unit diodes.

The light having arbitrarily selected color irradiates the reflection surface S, and this light also irradiates the inside of the upper case 1 made of a light transmittable plastic material and is externally radiated therefrom.

Figure 4:
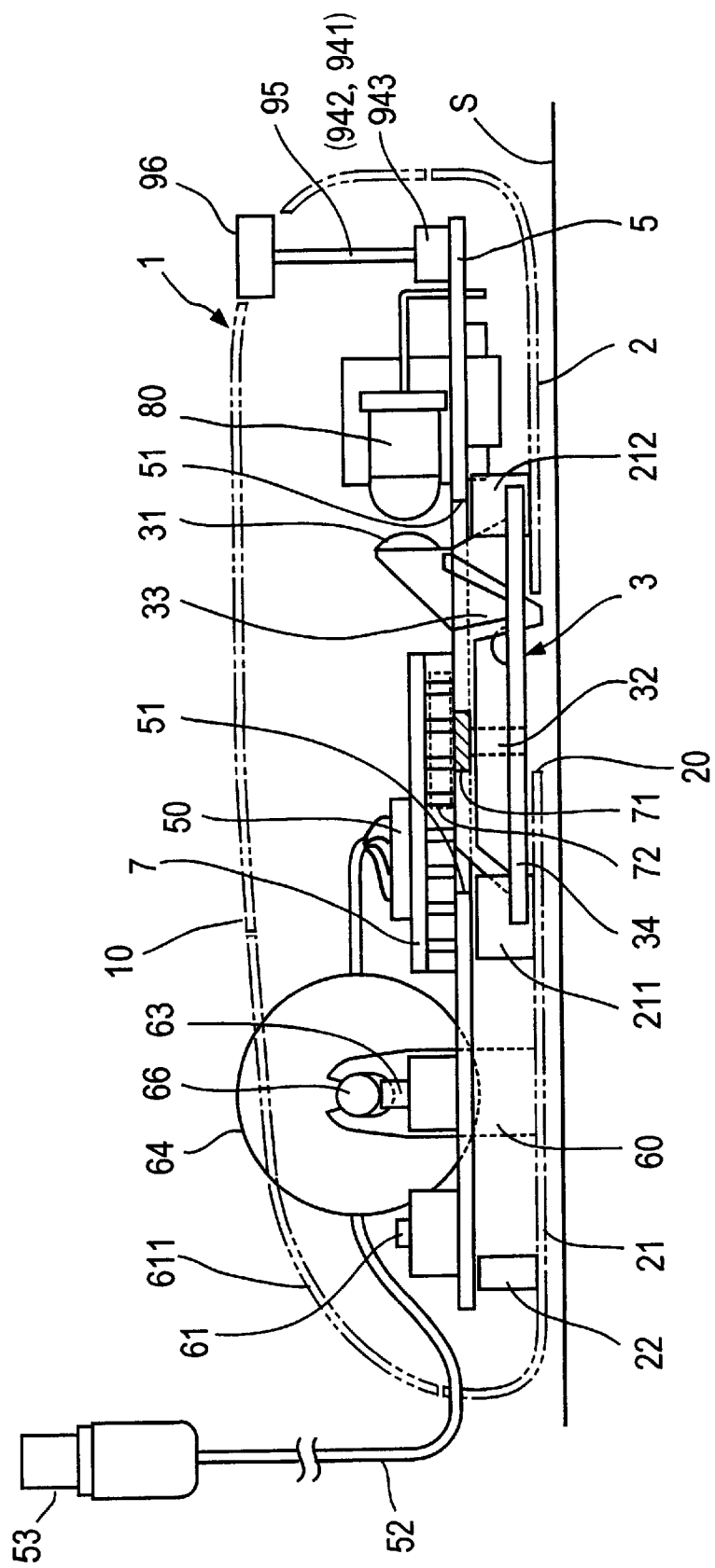
FIG. 4 is a side view for explaining another embodiment of the present invention.
Figure 6:
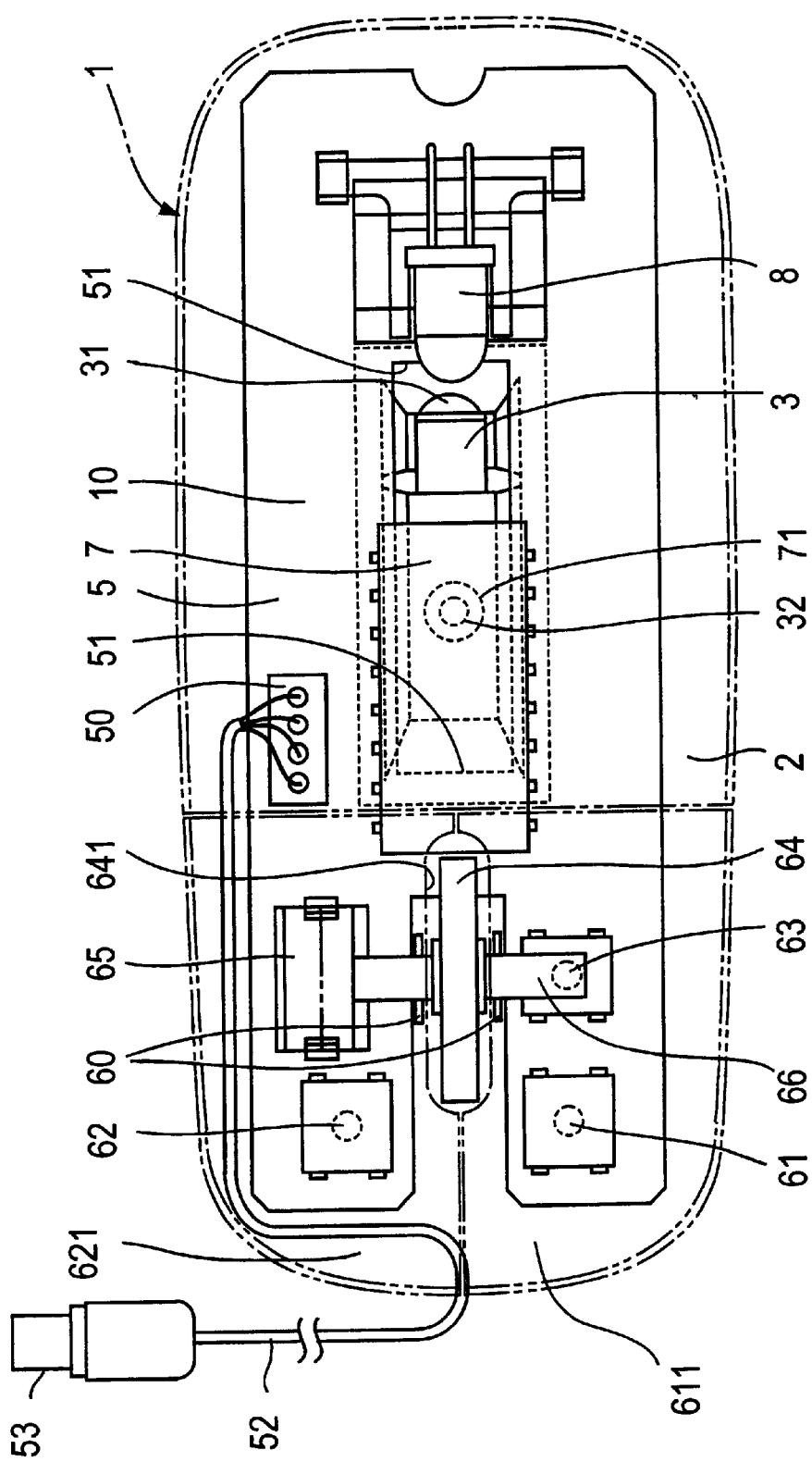
FIG. 6 is a plan view for explaining a conventional example of the image sensor mouse.
Figure 7:
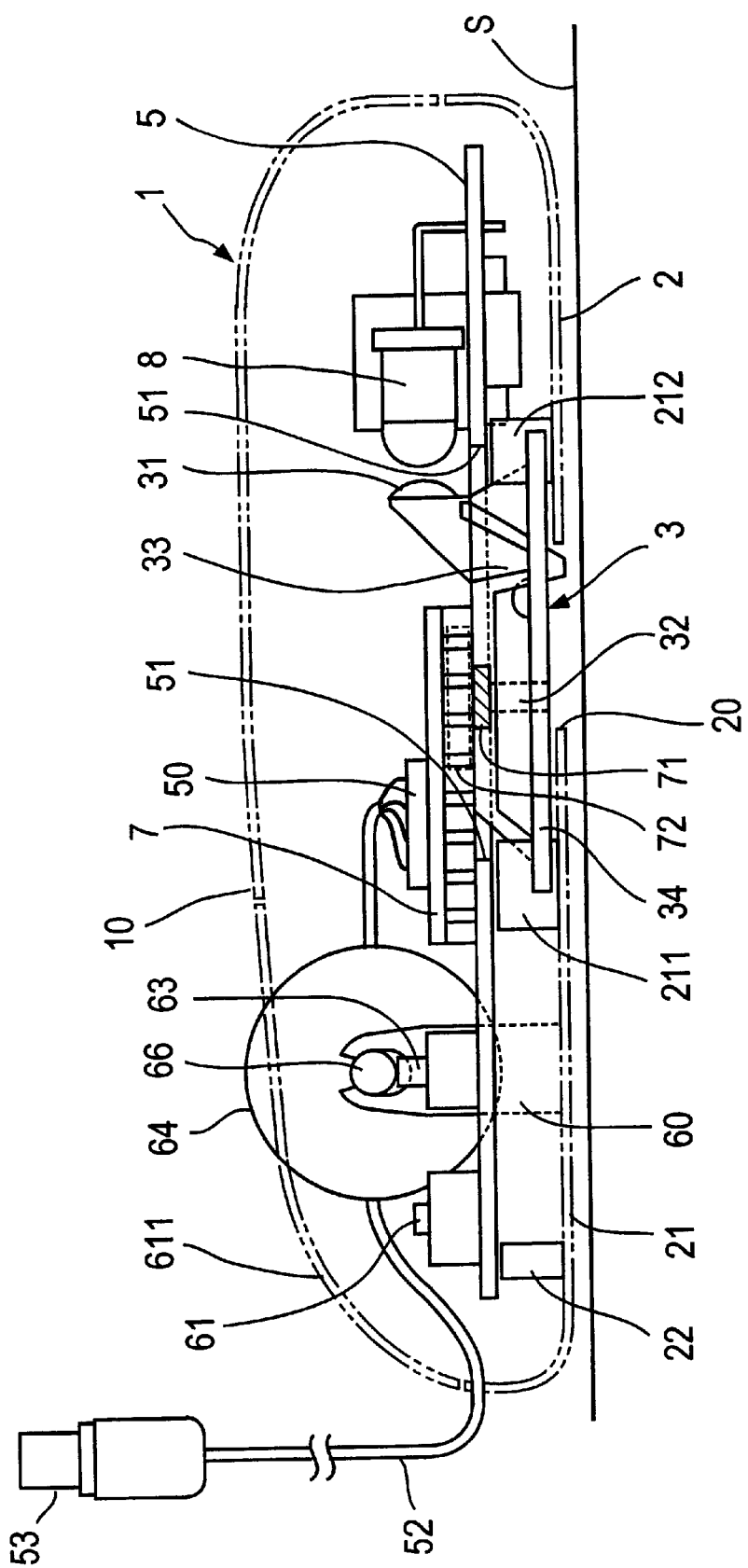
FIG. 7 a side view of the conventional example shown in FIG. 6.

Another embodiment in which the image sensor mouse according to the present invention is driven by a different control will be explained below with reference to FIG. 4 and FIGS. 5A and 5B.

A reference numeral 941 denotes a variable resistor for red (R) for adjusting the voltage of the red (R) light emitting unit diode 801, a reference numeral 942 denotes a variable resistor for green (G) for adjusting the voltage of the green (G) light emitting unit diode 802, and a reference numeral 943 denotes a variable resistor for blue (B) for adjusting the voltage of the blue (B) light emitting unit diode 803. Those variable resistors are positioned and mounted at the rear end position on the upper surface of the printed circuit board 5 such that the variable resistor for blue (B) 943 is located at the left side, the variable resistor for blue (B) 942 is located at the center, and the variable resistor for red (R) 941 is located at the right side. In addition, a driving rod 95 with a knob 96 of each variable resistor is slightly protruded from the upper side case 1.

In this embodiment, the red (R) light emitting unit diode 801 is connected in series to the variable resistor for red (R) 941, the green (G) light emitting unit diode 802 is connected in series to the variable resistor for green (G) 942, and the blue (B) light emitting unit diode 803 is connected in series to the variable resistor for blue (B) 943. A parallel connection circuit is constituted by those three series connection circuits. In addition, a series connection circuit is constituted by this parallel connection circuit and a switching transistor $Q_1$.

Figure 8A:
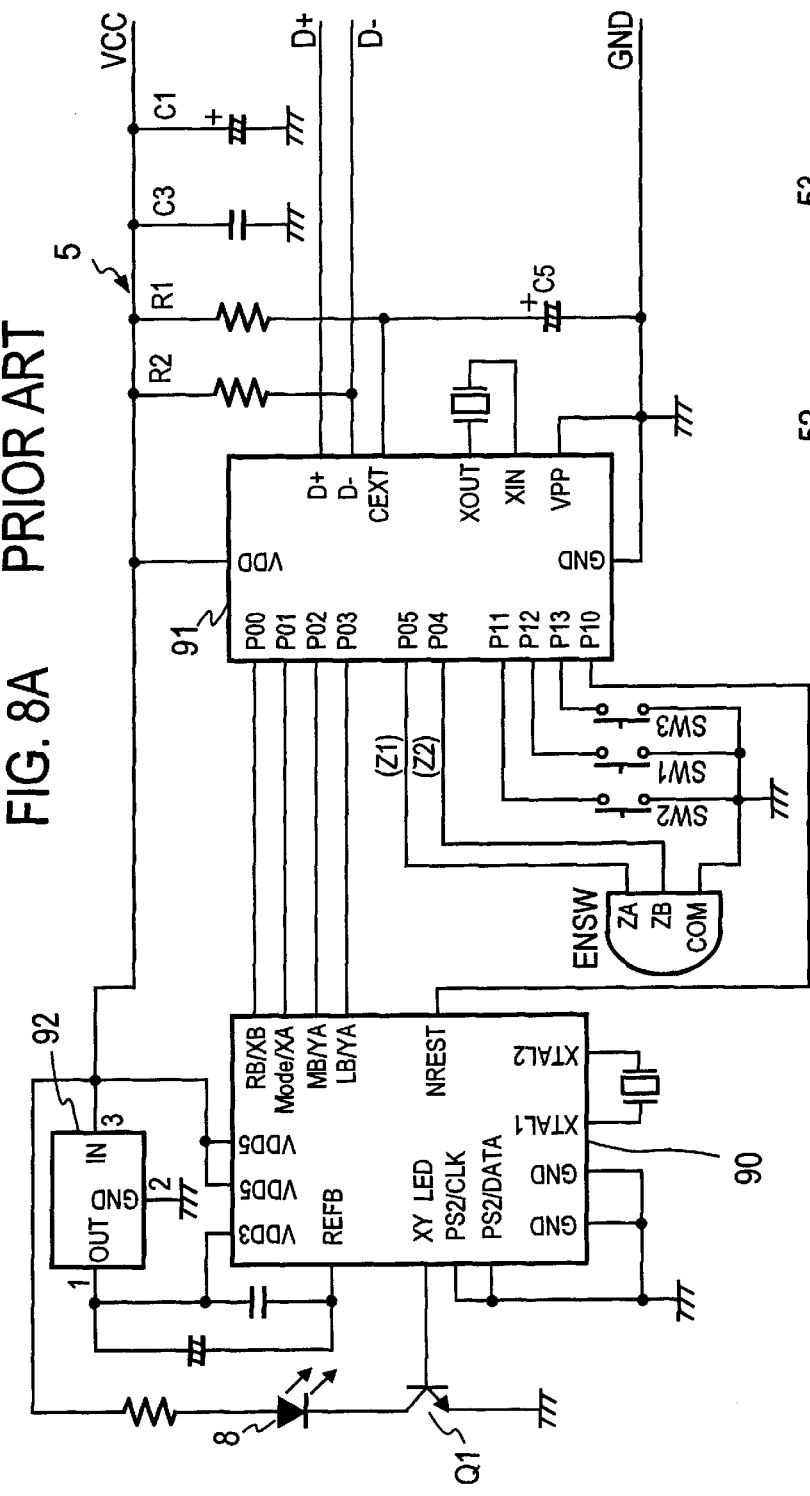
FIGS. 8A and 8B are circuit diagrams of the conventional example of the image sensor mouse.
Figure 8B:
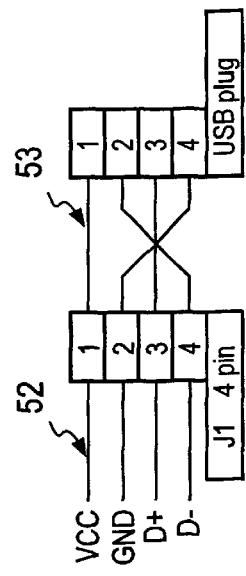

Furthermore, the voltage control integrated circuit 91, the switching control processing integrated circuit 90, and the voltage regulator 92 are the same in terms of their respective configurations as those shown in FIG. 8, and the 5 v voltage VCC is applied across the series connection circuit constituted by the parallel connection circuit and the switching transistor $Q_1$. When the switching transistor $Q_1$ is made conductive by a program control of the switching control processing integrated circuit 90, each unit diode is applied thereacross with a driving voltage of 5 v voltage VCC which is divided by the variable resistor.

In the case of this embodiment, by rotating the knobs 96 of the respective variable resistors for red (R) 941, for green (G) 942, and for blue (B) 943 to adjust the respective resistor values, the divided voltages applied to the corresponding unit diodes are changed. Based on the change of the voltages applied to the respective unit diodes, intensity of the light emitted from each of the unit diodes is changed. The emitted light obtained by mixing those lights emitted from those unit diodes changes to a full color light.

According to the present invention, a full-color light emitting diode that emits a full color light is used instead of using a single color light emitting diode used as a light source for irradiating a reflection surface on which the image sensor mouse is moved in the conventional optical type image sensor mouse. By irradiating the light transmittable upper side case from the inside thereof by this emitted light and by transmitting the light through the upper side case, the external view of the image sensor mouse can be changed. The present invention provides an effect that the color change of the external view of the image sensor mouse gives a psychologically good influence to the operator.

Furthermore, by selecting an emitted light in such an appropriate color that is highly sensitive or distinguishable in comparison to the color of the reflection surface under the mouse, erroneous operations can be effectively prevented from occurring or can be reduced, and hence the operational efficiency of the image sensor mouse and the computer to which this mouse is connected can be improved.

What is claimed is:

1. An image sensor mouse of a contact-less type that is moved on a reflection surface in the state that a light emitted from a light emitting diode is irradiating the reflection surface, and performs recognition and comparison computation process of ever changing moving images of the reflection surface formed on a built-in image sensor to obtain information of moving direction and amount of movement of the image sensor mouse comprising:

a full color light emitting diode, as the light emitting diode, having a red light emitting unit diode, a green light emitting unit diode, and a blue light emitting unit diode; and means for varying separately respective driving voltages applicable to the respective unit diodes so as to select one or more unit diodes to be driven out of those three unit diodes and so as to vary the intensity of each of the emitted lights from the respective unit diodes;

whereby obtaining a mixed light in an arbitrary color.

2. The image sensor mouse according to claim 1 wherein said means varies any of said driving voltages in stepwise.

3. The image sensor mouse according to claim 1 wherein said means varies any of said driving voltages continuously in either increasingly or decreasingly.

4. The image sensor mouse according to claim 1 wherein the means for varying the driving voltages varies each of the respective driving voltages at intervals of constant or at random.

\* \* \* \* \*